United States Patent
Park et al.

(10) Patent No.: US 9,763,074 B2
(45) Date of Patent: Sep. 12, 2017

(54) APPARATUS, SYSTEM AND METHOD OF COMMUNICATING A BEACON FRAME

(71) Applicant: INTEL IP CORPORATION, Santa Clara, CA (US)

(72) Inventors: Minyoung Park, Portland, OR (US); Po-Kai Huang, Santa Clara, CA (US); Emily H. Qi, Camas, WA (US)

(73) Assignee: INTEL IP CORPORATION, Santa Clara, CA (US)

( * ) Notice: Subject to any disclaimer, the term of this patent is extended or adjusted under 35 U.S.C. 154(b) by 189 days.

(21) Appl. No.: 14/670,587

(22) Filed: Mar. 27, 2015

(65) Prior Publication Data

US 2016/0198327 A1 Jul. 7, 2016

Related U.S. Application Data

(60) Provisional application No. 62/099,164, filed on Jan. 1, 2015.

(51) Int. Cl.
*H04W 8/00* (2009.01)
*H04L 27/26* (2006.01)

(52) U.S. Cl.
CPC .......... *H04W 8/005* (2013.01); *H04L 27/261* (2013.01)

(58) Field of Classification Search
CPC ..... H04W 8/00; H04W 72/04; H04W 8/0051; H04L 5/00; H04L 27/261
See application file for complete search history.

(56) References Cited

U.S. PATENT DOCUMENTS

2014/0211659 A1* 7/2014 Abraham .......... H04W 52/0209
                                                              370/254
2015/0341811 A1* 11/2015 Deshpande .......... H04W 24/02
                                                              370/252

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Wi-Fi Alliance, Wi-Fi Peer-to-Peer (P2P) Technical Specification Version 1.5, Aug. 4, 2014, 183 pages.
IEEE P802.11ah™/D3.1; Draft Standard for Information technology—Telecommunications and information exchange between systems Local and metropolitan area networks—Specific requirements Part 11: Wireless LAN Medium Access Control (MAC) and Physical Layer (PHY) Specifications Amendment 6: Sub 1 GHz License Exempt Operation, Nov. 2014, 611 pages.

* cited by examiner

Primary Examiner — Anez Ebrahim
(74) Attorney, Agent, or Firm — Shichrur & Co.

(57) ABSTRACT

Some demonstrative embodiments include apparatuses, systems and/or methods of communicating a beacon frame. For example, a wireless station may be configured to 2generate a beacon frame having one or more fields including Neighbor Awareness Networking (NAN) information; and transmit the beacon frame over a Sub 1 Gigahertz (GHz) (S1G) band according to a discovery scheme including a plurality of NAN Discovery Windows (DW).

25 Claims, 6 Drawing Sheets

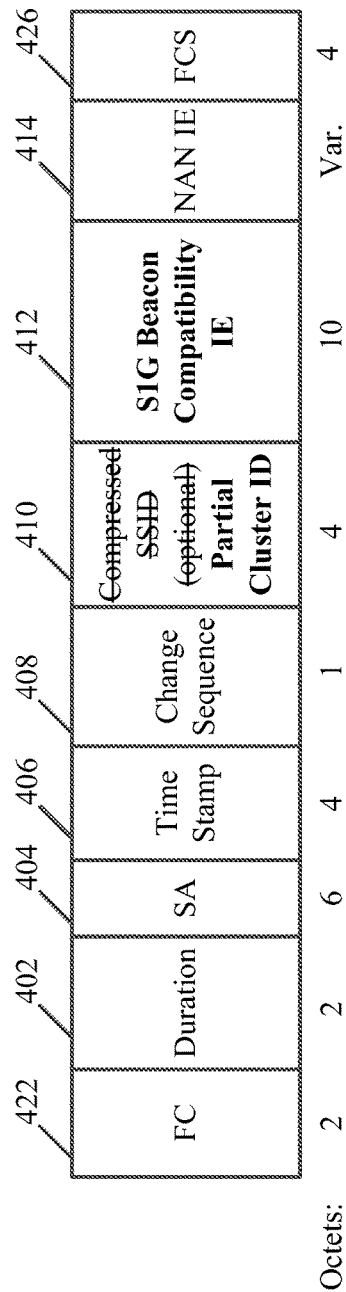
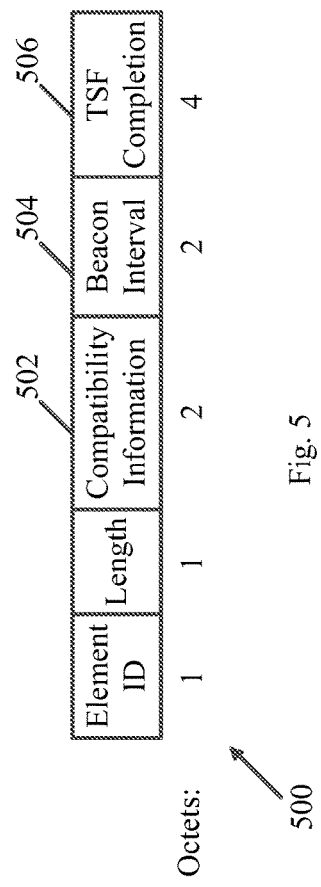
Fig. 4
Fig. 5

APPARATUS, SYSTEM AND METHOD OF COMMUNICATING A BEACON FRAME

CROSS REFERENCE

This Application claims the benefit of and priority from U.S. Provisional Patent Application No. 62/099,164 entitled "Apparatus, System and Method of Communicating a Beacon Frame", filed Jan. 1, 2015, the entire disclosure of which is incorporated herein by reference.

TECHNICAL FIELD

Embodiments described herein generally relate to communicating a beacon frame.

BACKGROUND

In some wireless communication networks a beacon frame may be communicated from a device to one or more other devices.

The beacon frame may have a predefined format.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 4 is a schematic illustration of a format of a beacon frame configured to be communicated over a sub 1 GHz band, and including fields configured for Neighbor Awareness Networking (NAN), in accordance with some demonstrative embodiments.

FIG. 5 is a schematic illustration of a format of a Beacon Compatibility Information Element (IE), in accordance with some demonstrative embodiments.

DETAILED DESCRIPTION

Figure 1:
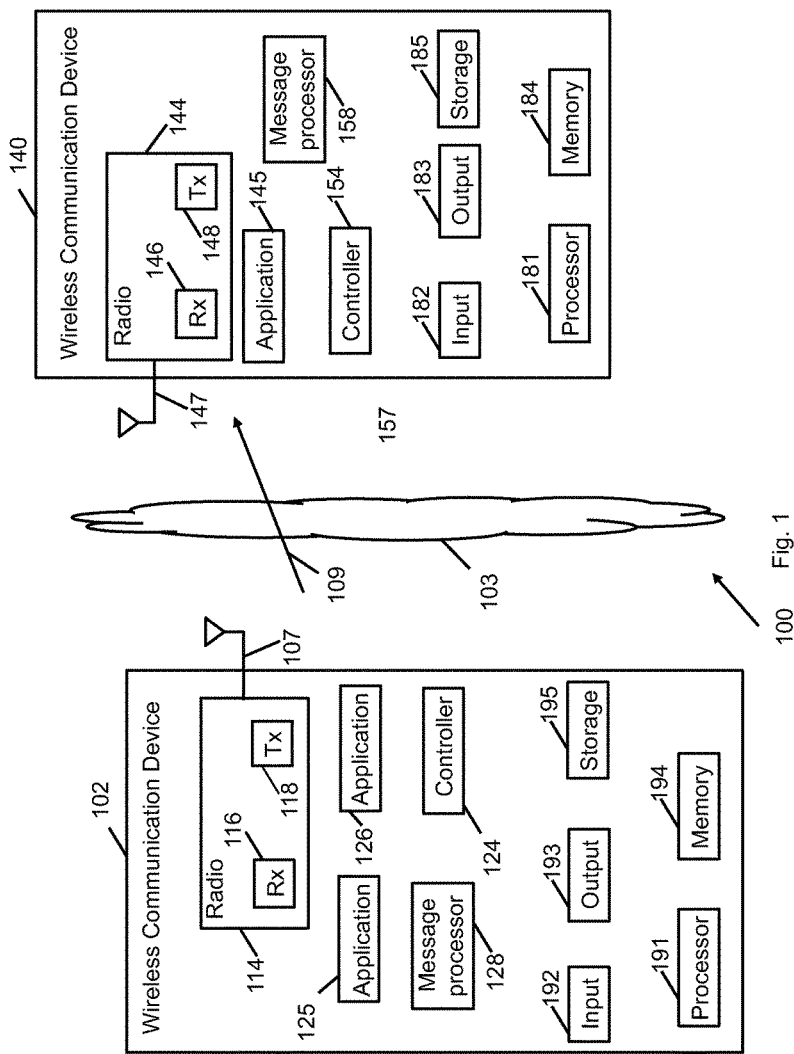
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including WFA Neighbor Awareness Networking (NAN) Specification) and/or future versions and/or derivatives thereof, devices and/or networks operating in accordance with existing WFA Peer-to-Peer (P2P) specifications (WiFi P2P technical specification, version 1.2, 2012) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012);

IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); and/or IEEE 802.11ah (IEEE P802.11ah™/D1.2; Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation", February 2014)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a User Equipment (UE), a Mobile Device (MD), a Station (STA), a Sub 1 Gigahertz (S1G) STA, a sensor type STA, an Access Point (AP), an AP STA, a non-AP STA, a PC, a desktop computer, a mobile computer, a laptop computer, an Ultrabook™ computer, a notebook computer, a tablet computer, a server computer, a handheld computer, a handheld device, an Internet of Things (IoT) device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In one example, a Sub 1 GHz (S1G) station (STA) may include a station configured to communicate over one or more frequency bands below 1 GHz. In one example, a S1G STA may be configured, for example, to communicate over one or more bands below 1 GHz, for example, excluding the TV White Space bands, e.g., with a transmission range up to 1 Kilometer (km) and a minimum data rate of at least 100 Kilobyte per second (Kb/s), or any other range and/or data rate. The S1G STA may perform any other additional or alternative functionality.

In one example, a sensor type station (STA) may include, for example, a STA characterized as small data size, low traffic, limited available power, and large number of STAs per AP. The sensor type STA may perform any other additional or alternative functionality.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a sub 1 Gigahertz (GHz) (S1G) frequency band.

In some demonstrative embodiments, devices 102 and/or 140 may be configured to communicate over the S1G band, e.g., as described below.

Additionally or alternatively, wireless communication medium 103 may include a wireless communication channel over a 2.4 GHz frequency band, a 5 GHz frequency band, a millimeterWave (mmWave) frequency band, e.g., a 60 GHz frequency band, and/or any other frequency band.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry and/or logic, modulation elements, demodulation elements, amplifiers, analog to digital and digital to analog converters, filters, and/or the like. In one example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable to transmit and/or receive wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102 and/or 140 may be part of, or may form, a wireless local area network (WLAN).

In some demonstrative embodiments, wireless communication devices 102 and/or 140 may be part of, or may form, a WiFi network.

In some demonstrative embodiments, wireless communication devices 102 and/or 140 may be part of, or may form, a WiFi Direct (WFD) network, e.g., a WiFi direct services (WFDS) network, and/or may perform the functionality of one or more WFD devices.

In one example, device 102 and device 140 may include, or may perform the functionality of a WiFi Direct device.

In some demonstrative embodiments, wireless communication devices 102, 115 and/or 140 may be capable of performing awareness networking communications, for example, according to an awareness protocol, e.g., a WiFi aware protocol, and/or any other protocol, e.g., as described below.

In some demonstrative embodiments, wireless communication medium 103 may include a direct link, for example, a PTP link, e.g., a WiFI direct P2P link, for example, to enable direct communication between device 102 and device 140.

In some demonstrative embodiments, wireless communication devices 102 and/or 140 may perform the functionality of WFD P2P devices. For example, devices 102 and/or 140 may be able to perform the functionality of a P2P client device, and/or P2P group Owner (GO) device.

In other embodiments, wireless communication devices 102 and/or 140 may form, and/or communicate as part of, any other network, and/or may perform the functionality of any other wireless devices or stations.

In some demonstrative embodiments, devices 102 and/or 140 may include one or more applications configured to provide, share, and/or to use one or more services, e.g., a social application, a file sharing application, a media application and/or the like, for example, using a NAN network, a PTP network, a P2P network, WFD network, or any other network.

In some demonstrative embodiments, device 102 may execute an application 125 and/or an application 126. In some demonstrative embodiments, device 140 may execute an application 145.

In some demonstrative embodiments, devices 102 and/or 140 may be capable of sharing, showing, sending, transferring, printing, outputting, providing, synchronizing, and/or exchanging content, data, and/or information, e.g., between application 154 and applications 125 and/or 126.

In some demonstrative embodiments, devices 102 and/or 140 may include a controller configured to control one or more functionalities of devices 102 and/or 140, for example, one or more functionalities of communication, e.g., communication over the S1G, NAN communication and/or any other communication, between devices 102 and/or 140 and/or other devices, and/or any other functionality, e.g., as described below. For example, device 102 may include a controller 124, and/or device 140 may include a controller 154.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154. Additionally or alternatively, one or more functionalities of controllers 124 and/or 154 may be implemented by logic, which may be executed by a machine and/or one or more processors, e.g., as described below. In one example, controllers 124 and/or 154 may include one or more processors having circuitry and/or logic to cause a device or a station, e.g., devices 102 and/or 140, to perform one or more functionalities, e.g., as described herein.

In one example, controller 124 may include one or more processors including circuitry and/or logic to cause a wireless device, e.g., device 102, and/or a wireless station, e.g., a wireless STA implemented by device 102, to perform one or more operations, communications and/or functionalities, e.g., as described herein.

In one example, controller 154 may include one or more processors including circuitry and/or logic to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, devices 102 and/or 140 may perform the functionality of a device or station, for example, a S1G device and/or STA, a NAN device and/or station, a WiFI device and/or station, a WFD device and/or station, a WLAN device and/or station, and/or any other device and/or station, capable of discovering other devices and/or stations according to a discovery protocol and/or scheme.

In some demonstrative embodiments, radios 114 and/or 144 may communicate over wireless communication medium 103 according to an awareness networking scheme.

In some demonstrative embodiments, the awareness networking scheme may include, for example, a discovery scheme, for example, a NAN discovery scheme, or any other awareness networking and/or discovery scheme, e.g., as described below.

In some demonstrative embodiments, devices 102 and/or 140 may perform a discovery process according to the discovery scheme, for example, to discover each other, and/or to establish a wireless communication link, e.g., directional and/or high throughput wireless communication link.

In some demonstrative embodiments, devices 102 and/or 140 may be configured to enable time synchronization between device 102, device 140 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102 and/or 140, for example, such that the STAs can find each other more efficiently, e.g., during a DW.

In one example, a DW may repeat, for example, every 512 Time Units (TUs), or every any other number of TUs. For example, a TU may include a time period of 1024 microseconds (usec), or any other time period.

In one example, a DW may be 16 TUs long, or any other number of TUs.

In some demonstrative embodiments, one of devices 102 and 140, e.g., device 102, may perform the functionality of a NAN master device, a master device, an anchor device, an anchor master device, or a manger device, which may be configured to transmit one or more beacons, e.g., as described below.

In some demonstrative embodiments, another one of devices 102 and 140, e.g., device 140, may perform the functionality of a NAN device, which may be configured to receive and process the beacons, e.g., as described below.

In some demonstrative embodiments, the NAN master device may be configured to transmit a synchronization (Sync) beacon, e.g., within a DW, and/or a discovery beacon, e.g., between consecutive DWs.

In some demonstrative embodiments, the sync and discovery beacons may include information for performing one or more NAN operations, for example, timestamp information, which may be used for time synchronization between the NAN devices.

In some demonstrative embodiments, devices 102 and/or 140 may perform the functionality of NAN devices, e.g., belonging to a NAN cluster, which may share a common set of NAN parameters, for example, including a common NAN timestamp, and/or a common time period between consecutive discovery windows, e.g., as described above.

In one example, device 102 may be configured to transmit one or more beacons, for example, one or more sync beacons and/or one or more discovery beacons, in a NAN cluster including devices 102 and 140.

In some demonstrative embodiments, the NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, the sync and/or discovery beacons of the NAN cluster may be configured to be communicated based on a format of a beacon frame, which may be configured to be communicated over the 2.4 GHz and/or 5 GHz frequency bands, e.g., as described below.

In one example, the sync and/or discovery beacons of the NAN cluster may be based on a format of a beacon frame, which be, for example, in compliance with an IEEE 802.11 Specification, e.g., a IEEE 802.11-2012 specification.

Figure 2:
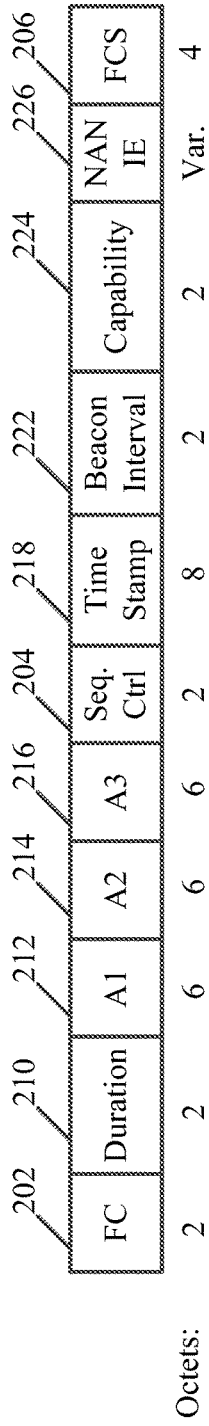
FIG. 2 is a schematic illustration of a format of a beacon frame configured to be communicated over a 2.4 Gigahertz (GHz) or 5 GHz band, in accordance with some demonstrative embodiments.

Reference is made to FIG. 2, which schematically illustrates a format of a beacon frame 200 configured to be communicated over the 2.4 GHz and/or 5 GHz bands, in accordance with some demonstrative embodiments.

As shown in FIG. 2, the beacon frame 200 may include a frame check field 202, a sequence control field 204, and/or a frame checksum field 206, e.g., in accordance with a IEEE 802.11-2012 specification.

As shown in FIG. 2, the beacon frame 200 may include an address field 212, denoted A1, an address field 214, denoted A2, and an address field 216, denoted A3.

In some demonstrative embodiments, the address field 212 may be set to a broadcast address.

In some demonstrative embodiments, the address field 214 may be set to an address, e.g., a MAC address, of a transmitter of beacon frame 200.

In some demonstrative embodiments, the address field 216 may be set to a Cluster ID that identifies a NAN Cluster. For example, the cluster ID may be randomly chosen from a predefined range of MAC address values, e.g., 50-6F-9A-01-00-00 to 50-6F-9A-01-FF-FF, or any other range of addresses.

As shown in FIG. 2, the beacon frame 200 may include a time stamp field 218, e.g., having a length of 8 octets.

In some demonstrative embodiments, time stamp field 208 may include a Time Synchronization Function (TSF) value. For example, time stamp field 208 may include a cluster TSF value of a TSF of the NAN cluster, e.g., the NAN cluster identified by address field 216.

As shown in FIG. 2, the beacon frame 200 may include a duration field 210 configured to include a duration value for beacon frame 200, e.g., in accordance with an IEEE 802.11-2012 Specification, or any other Protocol or Specification.

As shown in FIG. 2, the beacon frame 200 may include a beacon interval field 222 configured to include a beacon interval of beacon frame 200.

In one example, the beacon interval may include a value of 512 TUs, for example, if beacon frame 200 includes a sync beacon configured for the 2.4 GHz and/or 5 Ghz frequency bands.

As shown in FIG. 2, the beacon frame 200 may include a capability information field 224 configured to include capability information corresponding to one or more capabilities of a sender of beacon frame 200.

As shown in FIG. 2, the beacon frame 200 may include a NAN information element (IE) field 226, e.g., having a variable length.

In some demonstrative embodiments, NAN IE field 226 may be configured to include one or more NAN attributes, for example, a service ID list attribute, a cluster attribute, a master indication attribute, and/or any other NAN attributes to be communicated in a NAN Sync beacon and/or a NAN discovery beacon.

Referring back to FIG. 1, in some demonstrative embodiments, devices 102 and/or 140 (FIG. 1) may be configured to communicate over the S1G band, for example, in addition to, or instead of communicating over the over the 2.4 GHz and 5 GHz bands.

In some demonstrative embodiments, devices 102 and/or 140 (FIG. 1) may be configured to communicate beacon frames over the S1G band.

In some demonstrative embodiments, the beacon frames over the S1G band may be based on a beacon frame format ("the S1G beacon format"), which may be configured for communication over the S1G band, e.g., as described below with reference to FIG. 3.

Figure 3:
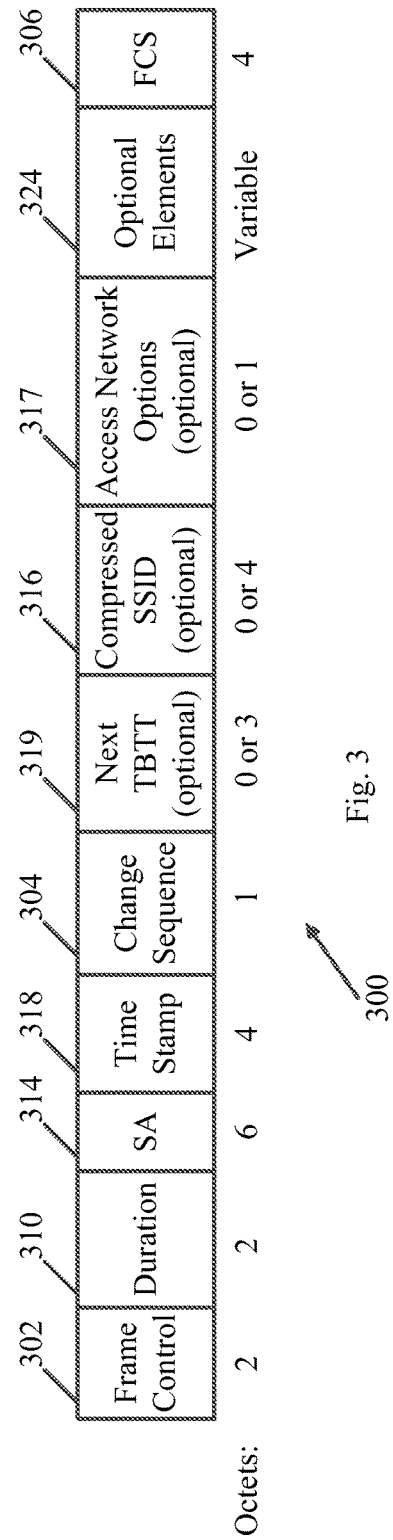
FIG. 3 is a schematic illustration of a format of a beacon frame configured to be communicated over a sub 1 GHz band, in accordance with some demonstrative embodiments.

Reference is made to FIG. 3, which schematically illustrates a format of a beacon frame 300 ("S1G beacon frame") configured to be communicated over the S1G band, in accordance with some demonstrative embodiments.

In one example, beacon frame 300 may include a S1G Short beacon frame format.

In another example, beacon frame 300 may include any other frame or any other format.

As shown in FIG. 3, beacon frame 300 may include a frame control field 302, a change sequence field 304, and/or a frame checksum field 306.

As shown in FIG. 3, beacon frame 300 may include a duration field 310 configured to include a duration value for beacon frame 300, e.g., in accordance with an IEEE 802.11-2012 Specification, and/or any other Protocol or Specification.

As shown in FIG. 3, beacon frame 300 may include a Sender Address (SA) field 314, configured to include an address, e.g., a MAC address, of a STA transmitting beacon frame 300.

As shown in FIG. 3, beacon frame 300 may include a time stamp field 318, for example, having a length of 4 octets.

As shown in FIG. 3, beacon frame 300 may optionally include one or more additional fields.

As shown in FIG. 3, beacon frame 300 may include an optional "Next TBTT" field 319, an optional Compressed SSID field 316, and/or an optional "Access Network Options" field 317.

As shown in FIG. 3, beacon frame 300 may include an "Optional Elements" field 324, for example, having a variable length.

In some demonstrative embodiments, the frame format of beacon frame 300, for example, as shown in FIG. 3, may not be designed to communicate at least some of the information of the NAN sync beacon and/or the NAN discovery beacon.

In one example, the frame format of beacon frame 300 may not include a capability information field, e.g., capability information field 224 (FIG. 2), for example, to include information corresponding to one or more capabilities of a sender of beacon frame 300.

In another example, the frame format of beacon frame 300 may not include a NAN IE field, e.g., NAN IE field 226 (FIG. 2), for example, to include the one or more NAN attributes.

In another example, time stamp field 318 of beacon frame 300, which may have a length of 4 octets, may not be sufficient to include the TSF of the NAN cluster, e.g., the TSF value in time stamp field 218 (FIG. 2), which may have a length of 8 octets.

In some demonstrative embodiments, one or more fields of beacon frame 300 may be modified and/or adapted to enable communicating a NAN sync beacon and/or a NAN discovery beacon, for example, over the S1G band, e.g., as described below.

Referring back to FIG. 1, in some demonstrative embodiments devices 102 and/or 140 may be configured to utilize one or more fields of the S1G beacon format, e.g., beacon frame 300 (FIG. 3), to communicate over the S1G band information of one or more NAN beacons, for example, NAN discovery beacons and/or NAN sync beacons, for example, information included in one or more fields of beacon frame 200 (FIG. 2), e.g., as described below.

In some demonstrative embodiments, devices 102 and/or 140 may be configured to use the S1G beacon frame format, for example, to communicate at least part of, e.g., all of, the necessary information for Wi-Fi NAN operation in the S1G band, e.g., as described below.

In some demonstrative embodiments, one or more fields in the S1G beacon frame, e.g., beacon frame 300 (FIG. 3), which is configured to be communicated over the S1G band, may be, for example, redefined, modified, and/or adapted to include information of one or more fields of the beacon frame ("the 2.4/5 GHz beacon frame"), e.g., beacon frame 200 (FIG. 2), which is configured to be communicated over the 2.4 GHz and 5 GHz bands, e.g., as described below.

In some demonstrative embodiments, using the S1G beacon frame to communicate information of one or more fields of the 2.4/5 GHz beacon frame may enable, for example, to communicate information of a NAN beacon, for example, a NAN Sync beacon and/or a NAN discovery beacon, over the S1G band.

In some demonstrative embodiments, using the S1G beacon frame to communicate information of one or more fields of the 2.4/5 GHz beacon frame may enable, for example, performing communications of a NAN, e.g., a WiFi NAN, over the S1G band, for example, while complying with a configuration of a S1G beacon frame format, e.g., according to an IEEE 802.11ah Specification, and/or any other Protocol or Specification.

In some demonstrative embodiments, a device of devices 102 and 140, e.g., device 102, may be configured to generate a beacon frame having one or more fields including NAN information.

In some demonstrative embodiments, message generator 128 may be configured to generate a beacon frame 109 having one or more fields including NAN information.

In some demonstrative embodiments, radio 114 may be configured to transmit the beacon frame 109 over the S1G band according to a discovery scheme including a plurality of NAN DWs.

In one example, radio 114 may transmit the beacon frame 109 over the S1G band during a DW of NAN cluster including devices 102 and 140.

In some demonstrative embodiments, receiver 146 may receive beacon frame 109, and message processor 158 may process beacon frame 109.

In some demonstrative embodiments, controller 154 may perform one or more functionalities of device 140 with respect to the NAN, e.g., based on the NAN information of beacon frame 109.

In some demonstrative embodiments, radios 114 and/or 144 may communicate during one or more DWs of the NAN cluster, for example, according to the NAN information in beacon frame 109.

In some demonstrative embodiments, beacon frame 109 may include an S1G beacon frame.

In some demonstrative embodiments, beacon frame 109 may be in compliance with an IEEE 802.11ah Specification.

In some demonstrative embodiments, the NAN information in beacon frame 109 may include at least part of NAN information of a beacon frame configured for a 2.4 GHz or 5 GHZ band.

In one example, the NAN information in beacon frame 109 may include at least part of the NAN information of beacon frame 200 (FIG. 2).

In some demonstrative embodiments, beacon frame 109 may include a duration field, a Sender Address (SA) field, a timestamp field, and/or a change sequence field, e.g., as described below.

In some demonstrative embodiments, beacon frame 109 may include a partial cluster Identifier (ID) field including a partial Media Access Control (MAC) address of the NAN cluster, e.g., as described below.

In some demonstrative embodiments, beacon frame 109 may include a S1G beacon compatibility Information Element (IE), and/or a NAN IE, e.g., as described below.

In some demonstrative embodiments, the S1G beacon compatibility IE may include a beacon interval field including a beacon interval of a NAN beacon, for example, a NAN Synchronization beacon or a NAN Discovery Beacon, e.g., as described below.

In some demonstrative embodiments, the beacon interval may be n times 512 TUs, for example, if beacon frame 109 is the NAN synchronization beacon. The value of n may be an integer greater than zero.

In some demonstrative embodiments, the beacon interval may be n times 100 TUs, for example, if beacon frame 109 is the NAN discovery beacon.

In some demonstrative embodiments, the value of n may be 10. For example, the beacon interval may be 5120 TUs, e.g., if beacon frame 109 is the NAN synchronization beacon, or the beacon interval may be 1000 TUs, e.g., if beacon frame 109 is the NAN discovery beacon.

In some demonstrative embodiments, the time stamp field of beacon frame 109 may include a first portion of a Time Synchronization Function (TSF) timer, and an information element (IE) of beacon frame 109, e.g., the S1G beacon compatibility IE, may include a second portion of the TSF timer, e.g., as described below.

In some demonstrative embodiments, the S1G beacon compatibility IE may include a Time Synchronization Function (TSF) completion field including four most significant octets of the TSF timer, e.g., as described below.

In some demonstrative embodiments, the time stamp field of beacon frame 109 field may include four least significant octets of the TSF timer.

Reference is made to FIG. 4, which schematically illustrates a format of a beacon frame 400 configured to be communicated over a sub 1 GHz band, and including fields configured for a NAN communication, in accordance with some demonstrative embodiments.

In some demonstrative embodiments, beacon frame 400 may be communicated between devices 102 (FIG. 1) and 140 (FIG. 1), for example, over a S1G band, for example, to perform NAN communication over the S1G band.

In one example, controller 124 (FIG. 1) may cause message processor 128 (FIG. 1) to generate beacon frame 400, and transmitter 118 (FIG. 1) to transmit beacon frame 400, for example, as a Sync beacon, e.g., during a DW of a NAN cluster, or as a Discovery beacon, e.g., between two consecutive DWs of the NAN cluster.

In one example, receiver 146 (FIG. 1) may receive beacon frame 400, message processor 158 (FIG. 1) may process the received beacon frame 400, and/or controller 154 (FIG. 1) may perform one or more functionalities of device 140 (FIG. 1) with respect to the NAN, e.g., based on beacon frame 400.

In some demonstrative embodiments, beacon frame 400 may include a frame control field 422, and/or a frame checksum field 426.

In some demonstrative embodiments, frame control field 422, may be compatible, for example, with the frame control field 302 (FIG. 3) of beacon frame format 300 (FIG. 3), and/or frame checksum field 426, may be compatible, for example, with the frame checksum field 306 (FIG. 3) of beacon frame format 300 (FIG. 3).

In some demonstrative embodiments, beacon frame 400 may include a Duration field 402.

In some demonstrative embodiments, duration field 402, may be compatible, for example, with the duration field 310 (FIG. 3) of beacon frame format 300 (FIG. 3).

In some demonstrative embodiments, duration field 402 may be set to a duration value for the beacon frame 400, e.g., in accordance with an IEEE 802.11-2012 Specification, and/or any other Protocol or Specification.

In some demonstrative embodiments, beacon frame 400 may include a SA field 404, which may be set to an address, e.g., a MAC address, of a transmitter of beacon frame 400. For example, SA field 404 may include the MAC address of device 102 (FIG. 1).

in one example, SA field 404 may be compatible, for example, with the Sender Address field 314 (FIG. 3) of beacon frame format 300 (FIG. 3).

In some demonstrative embodiments, beacon frame 400 may include a timestamp field 406, which may be compatible, for example, with the timestamp field 318 (FIG. 3) of beacon frame format 300 (FIG. 3).

In some demonstrative embodiments, timestamp field 406 may be set to include at least part of a timer value, e.g., a TSF value, for example, the four least significant octets of the TSF timer at an AP, e.g., in accordance with an IEEE 802.11ah Specification.

In some demonstrative embodiments, beacon frame 400 may include a Change Sequence field 408, which may be compatible, for example, with the Change Sequence field 304 (FIG. 3) of beacon frame format 300 (FIG. 3).

In one example, Change Sequence field 408 may include an unsigned integer, which may increment, for example, when a critical update to beacon frame 400 has occurred, e.g., in compliance with an IEEE 802.11ah specification.

In some demonstrative embodiments, beacon frame 400 may include a Partial Cluster ID field 410, which may be configured to replace and/or redefine the Compressed SSID field 316 (FIG. 3) of beacon frame format 300 (FIG. 3), e.g., as described below.

In some demonstrative embodiments, the Partial Cluster ID field 410 may be configured to include information, which may be based on, comparable to, and/or related to, the information of the address field 206 (FIG. 2) of beacon frame 200 (FIG. 2).

In some demonstrative embodiments, the Partial Cluster ID field 410 may include a partial address, for example, a partial MAC address, which may have, for example, a value from a predefined range, e.g., A5-01-00-00 to A5-01-FF-FF, or any other range.

In one example, the first octet 'A5' of the partial MAC address may be, for example, generated by XOR operations, e.g., 0x50 XOR 0x6F XOR 0x9A, wherein XOR is the exclusive OR operation.

In another example, the first octet 'A5' of the partial MAC address may be, for example, generated by any other operation and/or method.

In some demonstrative embodiments, beacon frame 400 may include an S1G Beacon Compatibility Information Element (IE) 412 and/or a NAN IE 414, e.g., as described below.

In some demonstrative embodiments, S1G Beacon Compatibility Information Element (IE) 412 and/or NAN IE 414 may be included, for example, as part of the Optional Elements field 324 (FIG. 3) of beacon frame format 300 (FIG. 3).

In some demonstrative embodiments, NAN IE field 412 may include NAN information for a NAN, for example, at least part of the NAN information defined by a NAN Specification, e.g., a WiFi NAN Specification.

In one example, NAN IE field 412 may be compatible with NAN IE field 226 (FIG. 2) of beacon frame 200 (FIG. 2), and/or configured to include information, which may be based on, comparable to, and/or related to, the information of NAN IE field 226 (FIG. 2).

In some demonstrative embodiments, NAN IE field 412 may include one or more NAN attributes, for example, a service ID list attribute, a cluster attribute, a master indication attribute, and/or any other NAN attributes to be communicated in a NAN beacon, for example, a NAN Sync beacon and/or a NAN discovery beacon.

In some demonstrative embodiments, S1G Beacon Compatibility Information Element (IE) 412 may include a plurality of fields, e.g., one or more of the fields described below with reference to FIG. 5.

Reference is made to FIG. 5, which schematically illustrates a format of a Beacon Compatibility IE 500, in accordance with some demonstrative embodiments. For example, S1G Beacon Compatibility Information Element (IE) 412 may include Beacon Compatibility IE 500.

In some demonstrative embodiments, Beacon Compatibility IE 500 may include an S1G Beacon Compatibility IE.

In some demonstrative embodiments, Beacon Compatibility IE 500 may be configured in accordance with an IEEE 802.11ah Specification, or any other Protocol or Specification.

In some demonstrative embodiments, Beacon Compatibility IE 500 may include a TSF Completion field 506.

In some demonstrative embodiments, TSF Completion field 506 may be configured to include, for example, at least part of the TSF timer, for example, the four most significant octets of the TSF timer of the NAN cluster.

In some demonstrative embodiments, a Timestamp to be used, for example, in the NAN over the S1G band, may be defined, for example, based on the TSF Completion field 506.

In some demonstrative embodiments, the Timestamp to be used, for example, in the NAN over the S1G band, may be defined by concatenating the TSF Completion field 506 and the Timestamp field in the S1G beacon frame, e.g., timestamp field 406 (FIG. 4).

In some demonstrative embodiments, controller 124 (FIG. 1) may control message processor 128 to generate beacon frame 400 (FIG. 4).

In some demonstrative embodiments, controller 124 (FIG. 1) may control message processor 128 to generate beacon frame 400 (FIG. 4) including one or more fields representing a TSF timer of a NAN cluster including devices 102 and 140 (FIG. 1). The TSF timer may have a length of 8 octets.

In some demonstrative embodiments, controller 124 (FIG. 1) may control message processor 128 to include the four least significant octets of the TSF timer in timestamp field 406 (FIG. 4), and to include the four most significant octets of the TSF timer in TSF Completion field 506 (FIG. 5), which may be included within S1G Beacon Compatibility IE 412 (FIG. 4).

In some demonstrative embodiments, radio 114 (FIG. 1) may transmit beacon frame 400 (FIG. 4), and device 140 (FIG. 1) may receive beacon frame 400 (FIG. 4).

In some demonstrative embodiments, message processor 158 (FIG. 1) may process the reception of beacon frame 400 (FIG. 4).

In some demonstrative embodiments, controller 154 (FIG. 1) may be able to determine the TSF timer of the NAN cluster based on beacon frame 400 (FIG. 4).

In some demonstrative embodiments, controller 154 (FIG. 1) may determine the TSF timer of the NAN cluster, for example, by concatenating the four least significant octets of the TSF timer in timestamp field 406 (FIG. 4) of beacon frame 400 (FIG. 4), and the four most significant octets of the TSF timer in TSF Completion field 506 (FIG. 5).

In some demonstrative embodiments, Beacon Compatibility IE 500 may include a Beacon Interval field 504.

In some demonstrative embodiments, Beacon Interval field 504 may include information of the Beacon Interval defined for a NAN over the S1G band.

In some demonstrative embodiments, Beacon Interval field 504 may include timing information corresponding to the DWs of the NAN cluster.

In one example, Beacon Interval field 504 may include a beacon interval of a beacon interval of a NAN sync beacon or a NAN discovery beacon.

In some demonstrative embodiments, Beacon Interval field 504 may be set, e.g., by controller 124 (FIG. 1), for example, to n times 512 TUs, wherein n is an integer greater than 0, e.g., if Beacon Compatibility IE 500 is to be included as part of a Sync beacon.

In some demonstrative embodiments, Beacon Interval field 504 may be set, e.g., by controller 124 (FIG. 1), for example, to n times 100 TUs, wherein n is an integer greater than 0, e.g., if Beacon Compatibility IE 500 is to be included as part of a Discovery beacon.

In some demonstrative embodiments, the value of n may be set, for example, to 10, for example, to maintain similar overhead as Wi-Fi NAN operating in 2.4/5 GHz bands, for example, since communication over the S1G band, e.g., according to a IEEE 802.11ah Specification, may have a physical layer data rate which may be 10 times lower, e.g., compared to a 2.4/5 GHz operating Wi-Fi.

In other embodiments, n may be set to any other value.

In some demonstrative embodiments, Beacon Compatibility IE 500 may include a Compatibility Information field 502.

In some demonstrative embodiments, Compatibility Information field 502 may include information of a Compatibility Information field defined for a NAN, e.g., according to a Wi-Fi NAN specification and/or any other specification.

In one example, Compatibility Information field 502 may be compatible with capability field 224 (FIG. 2) of beacon frame 200 (FIG. 2), and/or configured to include information, which may be based on, comparable to, and/or related to, the information of capability field 224 (FIG. 2).

In some demonstrative embodiments, Compatibility Information field 502 may include one or more fields, e.g., one or more fields of the compatibility information field described below with reference to FIG. 6.

Figure 6:
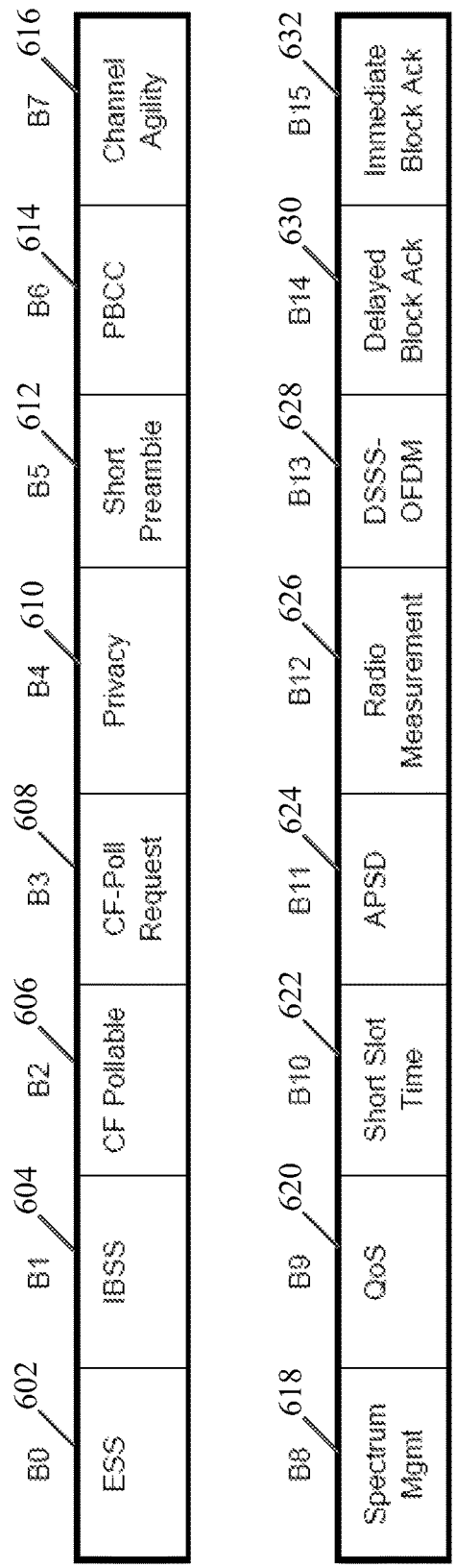
FIG. 6 is a schematic illustration of a format of a capability information field, in accordance with some demonstrative embodiments.

FIG. 6 is a schematic illustration of a format of a capability information field 600 configured to be communicated over a sub 1 GHz band, and including fields configured for a NAN communication, in accordance with some demonstrative embodiments.

In some demonstrative embodiments, capability information field 600 may be communicated as part of beacon frame 400 (FIG. 4), for example, in the Compatibility Information field 502 (FIG. 5) of S1G Beacon Compatibility IE 412 (FIG. 4).

In some demonstrative embodiments, capability information field 600 may be configured in accordance with a NAN Specification, or any other Protocol or Specification.

As shown in FIG. 6, capability information field 600 may include an Extended Service Set (ESS) field 602, an Independent BSS (IBSS) field 604, a Contention Free (CF) Pollable field 606, a CF-Poll request field 608, a Privacy field 610, a short Preamble field 612, a packet binary convolutional code (PBCC) field 614, and/or a Channel Agility field 616.

As shown in FIG. 6, capability information field 600 may also include a Spectrum management (Mgmt) field 618, a quality of service (QoS) field 620, a Short Slot Time field 622, an automatic power save delivery (APSD) field 624, a Radio Measurement field 626, a Direct sequence spread spectrum orthogonal frequency division multiplexing (DSSS-OFDM) field 628, a delayed Block Ack field 630, and/or an Immediate Block Ack field 632.

In some demonstrative embodiments, fields of the capability information field 600 may be set, e.g., by controller 124 (FIG. 1), for example, to predefined values, for example, when capability information field 600 is communicated as part of a NAN beacon over the S1G band. For example, ESS field 602 may be set to include the value '0', IBSS field 604 may be set to include the value '0', CF Pollable field 606 may be set to include the value '0', CF-Poll request field 608 may be set to include the value '0', Privacy field 610 may be set to include the value '0', short Preamble field 612 may be set to include the value '1', PBCC field 614 may be set to include the value '0', and/or Channel Agility field 616 may be set to include the value '0', Short Slot Time field 622 may be set to include the value '1', and/or DSSS-OFDM field 628 may be set to include the value '0'.

In some demonstrative embodiments, Spectrum Mgmt field 618, QoS field 620, APSD field 624, Radio Measurement field 626, delayed Block Ack field 630, and/or Immediate Block Ack field 632 may be set, e.g., by controller 124 (FIG. 1), for example, in accordance to an IEEE 802.11-2012 Standard, for example, when capability information field 600 is to be communicated over the S1G band.

Figure 7:
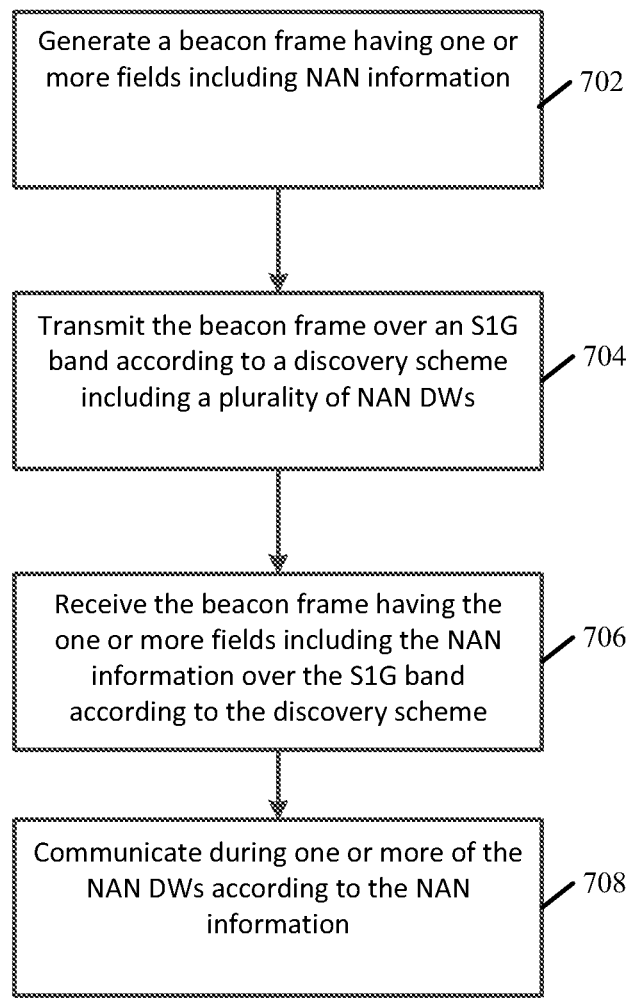
FIG. 7 is a schematic flow-chart illustration of a method of communicating a beacon frame, in accordance with some demonstrative embodiments.

Reference is made to FIG. 7, which schematically illustrates a method of communicating a beacon frame, in accordance with some demonstrative embodiments. For example, one or more of the operations of the method of FIG. 7 may be performed by a wireless communication system, e.g., system 100 (FIG. 1); a wireless device, e.g., wireless devices 102 and/or 140 (FIG. 1); a radio, e.g., radios 114 and/or 154 (FIG. 1); a controller, e.g., controllers 124 and/or 154 (FIG. 1); and/or a message processor, e.g., message processors 128 and/or 158 (FIG. 1).

As indicated at block 702, the method may include generating a beacon frame having one or more fields including NAN information. For example, message processor 128 (FIG. 1) may generate beacon frame 109 (FIG. 1) including the NAN information, e.g., as described above.

As indicated at block 704, the method may include transmitting the beacon frame over an S1G band according to a discovery scheme including a plurality of NAN DWs. For example, radio 114 (FIG. 1) may transmit beacon frame 109 (FIG. 1) over the S1G band according to the discovery scheme including the plurality of NAN DWs, e.g., as described above.

As indicated at block 706, the method may include receiving over the S1G band the beacon frame having the one or more fields including the NAN information according to the discovery scheme. For example, device 140 (FIG. 1) may receive beacon frame 109 (FIG. 1) including the NAN information over the S1G band, e.g., as described above.

As indicated at block 708, the method may include communicating during one or more of the NAN DWs according to the NAN information. For example, radios 114 and 144 (FIG. 1) may communicate during the one or more of the NAN DWs according to the NAN information received in beacon frame 109 (FIG. 1), e.g., as described above.

Figure 8:
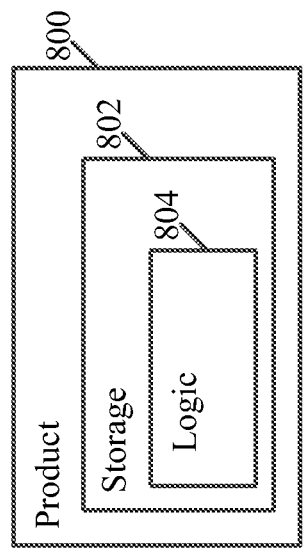
FIG. 8 is a schematic illustration of a product, in accordance with some demonstrative embodiments.

Reference is made to FIG. 8, which schematically illustrates a product of manufacture 800, in accordance with some demonstrative embodiments. Product 800 may include a non-transitory machine-readable storage medium 802 to store logic 804, which may be used, for example, to perform at least part of the functionality of devices 102 (FIG. 1) and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), and/or message processors 128 (FIG. 1) and/or 158 (FIG. 1), and/or to perform one or more operations of the method of FIG. 7. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to generate a beacon frame having one or more fields including Neighbor Awareness Networking (NAN) information; and transmit the beacon frame over a Sub 1 Gigahertz (GHz) (S1G) band according to a discovery scheme including a plurality of NAN Discovery Windows (DW).

Example 2 includes the subject matter of Example 1, and optionally, wherein the beacon frame comprises a duration field, a Sender Address (SA) field, a timestamp field, and a change sequence field.

Example 3 includes the subject matter of Example 1 or 2, and optionally, wherein the beacon frame comprises a partial cluster Identifier (ID) field including a partial Media Access Control (MAC) address of a NAN cluster.

Example 4 includes the subject matter of any one of Examples 1-3, and optionally, wherein the beacon frame comprises an S1G beacon compatibility Information Element (IE), and a NAN IE.

Example 5 includes the subject matter of Example 4, and optionally, wherein the S1G beacon compatibility IE includes a beacon interval field including a beacon interval of a NAN Synchronization beacon or a NAN Discovery Beacon.

Example 6 includes the subject matter of Example 5, and optionally, wherein the beacon interval is n times 512 time units (TU), if the beacon frame is the NAN synchronization beacon, or n times 100TU if the beacon frame is the NAN discovery beacon, wherein n is an integer greater than zero.

Example 7 includes the subject matter of Example 6, and optionally, wherein n is 10.

Example 8 includes the subject matter of any one of Examples 4-7, and optionally, wherein the S1G beacon compatibility IE includes a Time Synchronization Function (TSF) completion field including four most significant octets of a TSF timer.

Example 9 includes the subject matter of Example 8, and optionally, wherein the beacon frame includes a time stamp filed including four least significant octets of the TSF.

Example 10 includes the subject matter of any one of Examples 1-7, and optionally, wherein the beacon frame comprises a first time stamp field including a first portion of a Time Synchronization Function (TSF) timer, and an information element including a second time stamp field including a second portion of the TSF timer.

Example 11 includes the subject matter of Example 10, and optionally, wherein the first timestamp field includes four least significant octets of the TSF timer, and the second time stamp field includes four most significant octets of the TSF timer.

Example 12 includes the subject matter of any one of Examples 1-11, and optionally, wherein the NAN information comprises at least part of NAN information of a beacon frame configured for a 2.4 GHz or 5 GHZ band.

Example 13 includes the subject matter of any one of Examples 1-12, and optionally, wherein the beacon frame comprises an S1G beacon frame.

Example 14 includes the subject matter of any one of Examples 1-13, and optionally, wherein the beacon frame is in compliance with an IEEE 802.11ah Specification.

Example 15 includes the subject matter of any one of Examples 1-14 comprising a transmitter to transmit the beacon frame.

Example 16 includes the subject matter of any one of Examples 1-15, and optionally, comprising one or more antennas, a memory and a processor.

Example 17 includes an apparatus comprising logic and circuitry configured to cause a wireless station to process reception of a beacon frame over a Sub 1 Gigahertz (GHz) (S1G) band according to a discovery scheme including a plurality of Neighbor Awareness Networking (NAN) Discovery Windows (DW), the beacon frame having one or more fields including NAN information; and process communication during one or more of the NAN DWs according to the NAN information.

Example 18 includes the subject matter of Example 17, and optionally, wherein the beacon frame comprises a duration field, a Sender Address (SA) field, a timestamp field, and a change sequence field.

Example 19 includes the subject matter of Example 17 or 18, and optionally, wherein the beacon frame comprises a partial cluster Identifier (ID) field including a partial Media Access Control (MAC) address of a NAN cluster.

Example 20 includes the subject matter of any one of Examples 17-19, and optionally, wherein the beacon frame comprises an S1G beacon compatibility Information Element (IE), and a NAN IE.

Example 21 includes the subject matter of Example 20, and optionally, wherein the S1G beacon compatibility IE includes a beacon interval field including a beacon interval of a NAN Synchronization beacon or a NAN Discovery Beacon.

Example 22 includes the subject matter of Example 21, and optionally, wherein the beacon interval is n times 512 time units (TU), if the beacon frame is the NAN synchronization beacon, or n times 100 TU if the beacon frame is the NAN discovery beacon, wherein n is an integer greater than zero.

Example 23 includes the subject matter of Example 22, and optionally, wherein n is 10.

Example 24 includes the subject matter of any one of Examples 20-23, and optionally, wherein the S1G beacon compatibility IE includes a Time Synchronization Function (TSF) completion field including four most significant octets of a TSF timer.

Example 25 includes the subject matter of Example 24, and optionally, wherein the beacon frame includes a time stamp filed including four least significant octets of the TSF.

Example 26 includes the subject matter of any one of Examples 17-23, and optionally, wherein the beacon frame comprises a first time stamp field including a first portion of a Time Synchronization Function (TSF) timer, and an information element including a second time stamp field including a second portion of the TSF timer.

Example 27 includes the subject matter of Example 26, and optionally, wherein the first timestamp field includes four least significant octets of the TSF timer, and the second time stamp field includes four most significant octets of the TSF timer.

Example 28 includes the subject matter of any one of Examples 17-27, and optionally, wherein the NAN information comprises at least part of NAN information of a beacon frame configured for a 2.4 GHz or 5 GHZ band.

Example 29 includes the subject matter of any one of Examples 17-28, and optionally, wherein the beacon frame comprises an S1G beacon frame.

Example 30 includes the subject matter of any one of Examples 17-29, and optionally, wherein the beacon frame is in compliance with an IEEE 802.11ah Specification.

Example 31 includes the subject matter of any one of Examples 17-30, and optionally, comprising a receiver to receive the beacon frame.

Example 32 includes the subject matter of any one of Examples 17-31, and optionally, comprising one or more antennas, a memory and a processor.

Example 33 includes a system comprising a wireless device, the wireless device comprising one or more antennas; a memory; a processor; a message processor to generate a beacon frame having one or more fields including Neighbor Awareness Networking (NAN) information; and radio to transmit the beacon frame over a Sub 1 Gigahertz (GHz) (S1G) band according to a discovery scheme including a plurality of NAN Discovery Windows (DW).

Example 34 includes the subject matter of Example 33, and optionally, wherein the beacon frame comprises a duration field, a Sender Address (SA) field, a timestamp field, and a change sequence field.

Example 35 includes the subject matter of Example 33 or 34, and optionally, wherein the beacon frame comprises a partial cluster Identifier (ID) field including a partial Media Access Control (MAC) address of a NAN cluster.

Example 36 includes the subject matter of any one of Examples 33-35, and optionally, wherein the beacon frame comprises an S1G beacon compatibility Information Element (IE), and a NAN IE.

Example 37 includes the subject matter of Example 36, and optionally, wherein the S1G beacon compatibility IE includes a beacon interval field including a beacon interval of a NAN Synchronization beacon or a NAN Discovery Beacon.

Example 38 includes the subject matter of Example 37, and optionally, wherein the beacon interval is n times 512 time units (TU), if the beacon frame is the NAN synchronization beacon, or n times 100TU if the beacon frame is the NAN discovery beacon, wherein n is an integer greater than zero.

Example 39 includes the subject matter of Example 38, and optionally, wherein n is 10.

Example 40 includes the subject matter of any one of Examples 36-39, and optionally, wherein the S1G beacon compatibility IE includes a Time Synchronization Function (TSF) completion field including four most significant octets of a TSF timer.

Example 41 includes the subject matter of Example 40, and optionally, wherein the beacon frame includes a time stamp filed including four least significant octets of the TSF.

Example 42 includes the subject matter of any one of Examples 33-39, and optionally, wherein the beacon frame comprises a first time stamp field including a first portion of a Time Synchronization Function (TSF) timer, and an information element including a second time stamp field including a second portion of the TSF timer.

Example 43 includes the subject matter of Example 42, and optionally, wherein the first timestamp field includes four least significant octets of the TSF timer, and the second time stamp field includes four most significant octets of the TSF timer.

Example 44 includes the subject matter of any one of Examples 33-43, and optionally, wherein the NAN information comprises at least part of NAN information of a beacon frame configured for a 2.4 GHz or 5 GHZ band.

Example 45 includes the subject matter of any one of Examples 33-44, and optionally, wherein the beacon frame comprises an S1G beacon frame.

Example 46 includes the subject matter of any one of Examples 33-45, and optionally, wherein the beacon frame is in compliance with an IEEE 802.11ah Specification.

Example 47 includes a system including a wireless device, the wireless device comprising one or more antennas; a memory; a processor; a receiver to receive a beacon frame over a Sub 1 Gigahertz (GHz) (S1G) band according to a discovery scheme including a plurality of Neighbor Awareness Networking (NAN) Discovery Windows (DW), the beacon frame having one or more fields including NAN information; and a controller to control communication of the wireless device during one or more of the NAN DWs according to the NAN information.

Example 48 includes the subject matter of Example 47, and optionally, wherein the beacon frame comprises a duration field, a Sender Address (SA) field, a timestamp field, and a change sequence field.

Example 49 includes the subject matter of Example 47 or 48, and optionally, wherein the beacon frame comprises a partial cluster Identifier (ID) field including a partial Media Access Control (MAC) address of a NAN cluster.

Example 50 includes the subject matter of any one of Examples 47-49, and optionally, wherein the beacon frame comprises an S1G beacon compatibility Information Element (IE), and a NAN IE.

Example 51 includes the subject matter of Example 50, and optionally, wherein the S1G beacon compatibility IE includes a beacon interval field including a beacon interval of a NAN Synchronization beacon or a NAN Discovery Beacon.

Example 52 includes the subject matter of Example 51, and optionally, wherein the beacon interval is n times 512 time units (TU), if the beacon frame is the NAN synchronization beacon, or n times 100 TU if the beacon frame is the NAN discovery beacon, wherein n is an integer greater than zero.

Example 53 includes the subject matter of Example 52, and optionally, wherein n is 10.

Example 54 includes the subject matter of any one of Examples 50-53, and optionally, wherein the S1G beacon compatibility IE includes a Time Synchronization Function (TSF) completion field including four most significant octets of a TSF timer.

Example 55 includes the subject matter of Example 54, and optionally, wherein the beacon frame includes a time stamp filed including four least significant octets of the TSF.

Example 56 includes the subject matter of any one of Examples 47-53, and optionally, wherein the beacon frame comprises a first time stamp field including a first portion of a Time Synchronization Function (TSF) timer, and an information element including a second time stamp field including a second portion of the TSF timer.

Example 57 includes the subject matter of Example 56, and optionally, wherein the first timestamp field includes four least significant octets of the TSF timer, and the second time stamp field includes four most significant octets of the TSF timer.

Example 58 includes the subject matter of any one of Examples 47-57, and optionally, wherein the NAN information comprises at least part of NAN information of a beacon frame configured for a 2.4 GHz or 5 GHZ band.

Example 59 includes the subject matter of any one of Examples 47-58, and optionally, wherein the beacon frame comprises an S1G beacon frame.

Example 60 includes the subject matter of any one of Examples 47-59, and optionally, wherein the beacon frame is in compliance with an IEEE 802.11ah Specification.

Example 61 includes a method to be performed at a wireless device, the method comprising generating a beacon frame having one or more fields including Neighbor Awareness Networking (NAN) information; and transmitting the beacon frame over a Sub 1 Gigahertz (GHz) (S1G) band according to a discovery scheme including a plurality of NAN Discovery Windows (DW).

Example 62 includes the subject matter of Example 61, and optionally, wherein the beacon frame comprises a duration field, a Sender Address (SA) field, a timestamp field, and a change sequence field.

Example 63 includes the subject matter of Example 61 or 62, and optionally, wherein the beacon frame comprises a partial cluster Identifier (ID) field including a partial Media Access Control (MAC) address of a NAN cluster.

Example 64 includes the subject matter of any one of Examples 61-63, and optionally, wherein the beacon frame comprises an S1G beacon compatibility Information Element (IE), and a NAN IE.

Example 65 includes the subject matter of Example 64, and optionally, wherein the S1G beacon compatibility IE includes a beacon interval field including a beacon interval of a NAN Synchronization beacon or a NAN Discovery Beacon.

Example 66 includes the subject matter of Example 65, and optionally, wherein the beacon interval is n times 512 time units (TU), if the beacon frame is the NAN synchronization beacon, or n times 100 TU if the beacon frame is the NAN discovery beacon, wherein n is an integer greater than zero.

Example 67 includes the subject matter of Example 66, and optionally, wherein n is 10.

Example 68 includes the subject matter of any one of Examples 64-67, and optionally, wherein the S1G beacon compatibility IE includes a Time Synchronization Function (TSF) completion field including four most significant octets of a TSF timer.

Example 69 includes the subject matter of Example 68, and optionally, wherein the beacon frame includes a time stamp filed including four least significant octets of the TSF.

Example 70 includes the subject matter of any one of Examples 61-67, and optionally, wherein the beacon frame comprises a first time stamp field including a first portion of a Time Synchronization Function (TSF) timer, and an information element including a second time stamp field including a second portion of the TSF timer.

Example 71 includes the subject matter of Example 70, and optionally, wherein the first timestamp field includes four least significant octets of the TSF timer, and the second time stamp field includes four most significant octets of the TSF timer.

Example 72 includes the subject matter of any one of Examples 61-71, and optionally, wherein the NAN information comprises at least part of NAN information of a beacon frame configured for a 2.4 GHz or 5 GHZ band.

Example 73 includes the subject matter of any one of Examples 61-72, and optionally, wherein the beacon frame comprises an S1G beacon frame.

Example 74 includes the subject matter of any one of Examples 61-73, and optionally, wherein the beacon frame is in compliance with an IEEE 802.11ah Specification.

Example 75 includes a method to be performed at a wireless device, the method comprising receiving a beacon frame over a Sub 1 Gigahertz (GHz) (S1G) band according to a discovery scheme including a plurality of Neighbor Awareness Networking (NAN) Discovery Windows (DW), the beacon frame having one or more fields including NAN information; and communicating during one or more of the NAN DWs according to the NAN information.

Example 76 includes the subject matter of Example 75, and optionally, wherein the beacon frame comprises a duration field, a Sender Address (SA) field, a timestamp field, and a change sequence field.

Example 77 includes the subject matter of Example 75 or 76, and optionally, wherein the beacon frame comprises a partial cluster Identifier (ID) field including a partial Media Access Control (MAC) address of a NAN cluster.

Example 78 includes the subject matter of any one of Examples 75-77, and optionally, wherein the beacon frame comprises an S1G beacon compatibility Information Element (IE), and a NAN IE.

Example 79 includes the subject matter of Example 78, and optionally, wherein the S1G beacon compatibility IE includes a beacon interval field including a beacon interval of a NAN Synchronization beacon or a NAN Discovery Beacon.

Example 80 includes the subject matter of Example 79, and optionally, wherein the beacon interval is n times 512 time units (TU), if the beacon frame is the NAN synchronization beacon, or n times 100TU if the beacon frame is the NAN discovery beacon, wherein n is an integer greater than zero.

Example 81 includes the subject matter of Example 80, and optionally, wherein n is 10.

Example 82 includes the subject matter of any one of Examples 78-81, and optionally, wherein the S1G beacon compatibility IE includes a Time Synchronization Function (TSF) completion field including four most significant octets of a TSF timer.

Example 83 includes the subject matter of Example 82, and optionally, wherein the beacon frame includes a time stamp filed including four least significant octets of the TSF.

Example 84 includes the subject matter of any one of Examples 75-81, and optionally, wherein the beacon frame comprises a first time stamp field including a first portion of a Time Synchronization Function (TSF) timer, and an information element including a second time stamp field including a second portion of the TSF timer.

Example 85 includes the subject matter of Example 84, and optionally, wherein the first timestamp field includes four least significant octets of the TSF timer, and the second time stamp field includes four most significant octets of the TSF timer.

Example 86 includes the subject matter of any one of Examples 75-85, and optionally, wherein the NAN information comprises at least part of NAN information of a beacon frame configured for a 2.4 GHz or 5 GHZ band.

Example 87 includes the subject matter of any one of Examples 75-86, and optionally, wherein the beacon frame comprises an S1G beacon frame.

Example 88 includes the subject matter of any one of Examples 75-87, and optionally, wherein the beacon frame is in compliance with an IEEE 802.11ah Specification.

Example 89 includes a product including one or more tangible computer-readable non-transitory storage media comprising computer-executable instructions operable to, when executed by at least one computer processor, enable the at least one computer processor to implement a method at a wireless device, the method comprising generating a beacon frame having one or more fields including Neighbor Awareness Networking (NAN) information; and transmitting the beacon frame over a Sub 1 Gigahertz (GHz) (S1G) band according to a discovery scheme including a plurality of NAN Discovery Windows (DW).

Example 90 includes the subject matter of Example 89, and optionally, wherein the beacon frame comprises a duration field, a Sender Address (SA) field, a timestamp field, and a change sequence field.

Example 91 includes the subject matter of Example 89 or 90, and optionally, wherein the beacon frame comprises a partial cluster Identifier (ID) field including a partial Media Access Control (MAC) address of a NAN cluster.

Example 92 includes the subject matter of any one of Examples 89-91, and optionally, wherein the beacon frame comprises an S1G beacon compatibility Information Element (IE), and a NAN IE.

Example 93 includes the subject matter of Example 92, and optionally, wherein the S1G beacon compatibility IE includes a beacon interval field including a beacon interval of a NAN Synchronization beacon or a NAN Discovery Beacon.

Example 94 includes the subject matter of Example 93, and optionally, wherein the beacon interval is n times 512 time units (TU), if the beacon frame is the NAN synchronization beacon, or n times 100 TU if the beacon frame is the NAN discovery beacon, wherein n is an integer greater than zero.

Example 95 includes the subject matter of Example 94, and optionally, wherein n is 10.

Example 96 includes the subject matter of any one of Examples 92-95, and optionally, wherein the S1G beacon compatibility IE includes a Time Synchronization Function (TSF) completion field including four most significant octets of a TSF timer.

Example 97 includes the subject matter of Example 96, and optionally, wherein the beacon frame includes a time stamp filed including four least significant octets of the TSF.

Example 98 includes the subject matter of any one of Examples 92-95, and optionally, wherein the beacon frame comprises a first time stamp field including a first portion of a Time Synchronization Function (TSF) timer, and an information element including a second time stamp field including a second portion of the TSF timer.

Example 99 includes the subject matter of Example 98, and optionally, wherein the first timestamp field includes four least significant octets of the TSF timer, and the second time stamp field includes four most significant octets of the TSF timer.

Example 100 includes the subject matter of any one of Examples 92-99, and optionally, wherein the NAN information comprises at least part of NAN information of a beacon frame configured for a 2.4 GHz or 5 GHZ band.

Example 101 includes the subject matter of any one of Examples 92-100, and optionally, wherein the beacon frame comprises an S1G beacon frame.

Example 102 includes the subject matter of any one of Examples 92-101, and optionally, wherein the beacon frame is in compliance with an IEEE 802.11ah Specification.

Example 103 includes a product including one or more tangible computer-readable non-transitory storage media comprising computer-executable instructions operable to, when executed by at least one computer processor, enable the at least one computer processor to implement a method at a wireless device, the method comprising receiving a beacon frame over a Sub 1 Gigahertz (GHz) (S1G) band according to a discovery scheme including a plurality of Neighbor Awareness Networking (NAN) Discovery Windows (DW), the beacon frame having one or more fields including NAN information; and communicating during one or more of the NAN DWs according to the NAN information.

Example 104 includes the subject matter of Example 103, and optionally, wherein the beacon frame comprises a duration field, a Sender Address (SA) field, a timestamp field, and a change sequence field.

Example 105 includes the subject matter of Example 103 or 104, and optionally, wherein the beacon frame comprises a partial cluster Identifier (ID) field including a partial Media Access Control (MAC) address of a NAN cluster.

Example 106 includes the subject matter of any one of Examples 103-105, and optionally, wherein the beacon frame comprises an S1G beacon compatibility Information Element (IE), and a NAN IE.

Example 107 includes the subject matter of Example 106, and optionally, wherein the S1G beacon compatibility IE includes a beacon interval field including a beacon interval of a NAN Synchronization beacon or a NAN Discovery Beacon.

Example 108 includes the subject matter of Example 107, and optionally, wherein the beacon interval is n times 512 time units (TU), if the beacon frame is the NAN synchronization beacon, or n times 100 TU if the beacon frame is the NAN discovery beacon, wherein n is an integer greater than zero.

Example 109 includes the subject matter of Example 108, and optionally, wherein n is 10.

Example 110 includes the subject matter of any one of Examples 106-109, and optionally, wherein the S1G beacon compatibility IE includes a Time Synchronization Function (TSF) completion field including four most significant octets of a TSF timer.

Example 111 includes the subject matter of Example 110, and optionally, wherein the beacon frame includes a time stamp filed including four least significant octets of the TSF.

Example 112 includes the subject matter of any one of Examples 103-109, and optionally, wherein the beacon frame comprises a first time stamp field including a first portion of a Time Synchronization Function (TSF) timer, and an information element including a second time stamp field including a second portion of the TSF timer.

Example 113 includes the subject matter of Example 112, and optionally, wherein the first timestamp field includes four least significant octets of the TSF timer, and the second time stamp field includes four most significant octets of the TSF timer.

Example 114 includes the subject matter of any one of Examples 103-113, and optionally, wherein the NAN information comprises at least part of NAN information of a beacon frame configured for a 2.4 GHz or 5 GHZ band.

Example 115 includes the subject matter of any one of Examples 103-114, and optionally, wherein the beacon frame comprises an S1G beacon frame.

Example 116 includes the subject matter of any one of Examples 103-115, and optionally, wherein the beacon frame is in compliance with an IEEE 802.11ah Specification.

Example 117 includes an apparatus of wireless communication comprising, the apparatus comprising means for generating a beacon frame having one or more fields including Neighbor Awareness Networking (NAN) information; and means for transmitting the beacon frame over a Sub 1 Gigahertz (GHz) (S1G) band according to a discovery scheme including a plurality of NAN Discovery Windows (DW).

Example 118 includes the subject matter of Example 117, and optionally, wherein the beacon frame comprises a duration field, a Sender Address (SA) field, a timestamp field, and a change sequence field.

Example 119 includes the subject matter of Example 117 or 118, and optionally, wherein the beacon frame comprises a partial cluster Identifier (ID) field including a partial Media Access Control (MAC) address of a NAN cluster.

Example 120 includes the subject matter of any one of Examples 117-119, and optionally, wherein the beacon frame comprises an S1G beacon compatibility Information Element (IE), and a NAN IE.

Example 121 includes the subject matter of Example 120, and optionally, wherein the S1G beacon compatibility IE includes a beacon interval field including a beacon interval of a NAN Synchronization beacon or a NAN Discovery Beacon.

Example 122 includes the subject matter of Example 121, and optionally, wherein the beacon interval is n times 512 time units (TU), if the beacon frame is the NAN synchronization beacon, or n times 100TU if the beacon frame is the NAN discovery beacon, wherein n is an integer greater than zero.

Example 123 includes the subject matter of Example 122, and optionally, wherein n is 10.

Example 124 includes the subject matter of any one of Examples 120-123, and optionally, wherein the S1G beacon compatibility IE includes a Time Synchronization Function (TSF) completion field including four most significant octets of a TSF timer.

Example 125 includes the subject matter of Example 124, and optionally, wherein the beacon frame includes a time stamp filed including four least significant octets of the TSF.

Example 126 includes the subject matter of any one of Examples 117-123, and optionally, wherein the beacon frame comprises a first time stamp field including a first portion of a Time Synchronization Function (TSF) timer, and an information element including a second time stamp field including a second portion of the TSF timer.

Example 127 includes the subject matter of Example 126, and optionally, wherein the first timestamp field includes four least significant octets of the TSF timer, and the second time stamp field includes four most significant octets of the TSF timer.

Example 128 includes the subject matter of any one of Examples 117-127, and optionally, wherein the NAN information comprises at least part of NAN information of a beacon frame configured for a 2.4 GHz or 5 GHZ band.

Example 129 includes the subject matter of any one of Examples 117-128, and optionally, wherein the beacon frame comprises an S1G beacon frame.

Example 130 includes the subject matter of any one of Examples 117-129, and optionally, wherein the beacon frame is in compliance with an IEEE 802.11ah Specification.

Example 131 includes an apparatus of wireless communication comprising, the apparatus comprising receiving a beacon frame over a Sub 1 Gigahertz (GHz) (S1G) band according to a discovery scheme including a plurality of Neighbor Awareness Networking (NAN) Discovery Windows (DW), the beacon frame having one or more fields including NAN information; and communicating during one or more of the NAN DWs according to the NAN information.

Example 132 includes the subject matter of Example 131, and optionally, wherein the beacon frame comprises a duration field, a Sender Address (SA) field, a timestamp field, and a change sequence field.

Example 133 includes the subject matter of Example 131 or 132, and optionally, wherein the beacon frame comprises a partial cluster Identifier (ID) field including a partial Media Access Control (MAC) address of a NAN cluster.

Example 134 includes the subject matter of any one of Examples 131-133, and optionally, wherein the beacon frame comprises an S1G beacon compatibility Information Element (IE), and a NAN IE.

Example 135 includes the subject matter of Example 134, and optionally, wherein the S1G beacon compatibility IE includes a beacon interval field including a beacon interval of a NAN Synchronization beacon or a NAN Discovery Beacon.

Example 136 includes the subject matter of Example 135, and optionally, wherein the beacon interval is n times 512 time units (TU), if the beacon frame is the NAN synchronization beacon, or n times 100 TU if the beacon frame is the NAN discovery beacon, wherein n is an integer greater than zero.

Example 137 includes the subject matter of Example 136, and optionally, wherein n is 10.

Example 138 includes the subject matter of any one of Examples 134-137, and optionally, wherein the S1G beacon compatibility IE includes a Time Synchronization Function (TSF) completion field including four most significant octets of a TSF timer.

Example 139 includes the subject matter of Example 138, and optionally, wherein the beacon frame includes a time stamp filed including four least significant octets of the TSF.

Example 140 includes the subject matter of any one of Examples 131-137, and optionally, wherein the beacon frame comprises a first time stamp field including a first portion of a Time Synchronization Function (TSF) timer, and an information element including a second time stamp field including a second portion of the TSF timer.

Example 141 includes the subject matter of Example 140, and optionally, wherein the first timestamp field includes four least significant octets of the TSF timer, and the second time stamp field includes four most significant octets of the TSF timer.

Example 142 includes the subject matter of any one of Examples 131-141, and optionally, wherein the NAN information comprises at least part of NAN information of a beacon frame configured for a 2.4 GHz or 5 GHZ band.

Example 143 includes the subject matter of any one of Examples 131-142, and optionally, wherein the beacon frame comprises an S1G beacon frame.

Example 144 includes the subject matter of any one of Examples 131-143, and optionally, wherein the beacon frame is in compliance with an IEEE 802.11ah Specification.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless station to:
generate a beacon frame having one or more fields including Neighbor Awareness Networking (NAN) information, the beacon frame comprising a first timestamp field, a partial cluster Identifier (ID) field, and an information element comprising a second timestamp field, the partial cluster ID field comprising a partial Media Access Control (MAC) address of a NAN cluster, the first timestamp field comprising a first portion of a Time Synchronization Function (TSF) timer of the NAN cluster, the second timestamp field comprising a second portion, which is different from the first portion, of the TSF timer of the NAN cluster; and
transmit the beacon frame over a Sub 1 Gigahertz (GHz) (S1G) band according to a discovery scheme including a plurality of NAN Discovery Windows (DW).

2. The apparatus of claim 1, wherein the beacon frame comprises a duration field, a Sender Address (SA) field, and a change sequence field.

3. The apparatus of claim 2, wherein the first timestamp field is between the SA field and the change sequence field, and the information element is after the change sequence field.

4. The apparatus of claim 3, wherein the partial cluster ID field is between the change sequence field and the information element.

5. The apparatus of claim 1, wherein the information element comprises an S1G beacon compatibility Information Element (IE).

6. The apparatus of claim 5, wherein the S1G beacon compatibility IE includes a beacon interval field including a beacon interval of a NAN Synchronization beacon or a NAN Discovery Beacon.

7. The apparatus of claim 6, wherein the beacon interval is n times 512 time units (TU), if the beacon frame is the NAN synchronization beacon, or n times 100TU if the beacon frame is the NAN discovery beacon, wherein n is an integer greater than zero.

8. The apparatus of claim 7, wherein n is 10.

9. The apparatus of claim 1, wherein the second timestamp field comprises a TSF completion field including four most significant octets of the TSF timer.

10. The apparatus of claim 1, wherein the beacon frame comprises a NAN Information Element (IE).

11. The apparatus of claim 1, wherein the first timestamp field includes four least significant octets of the TSF timer, and the second timestamp field includes four most significant octets of the TSF timer.

12. The apparatus of claim 1, wherein the NAN information comprises at least part of NAN information of a beacon frame configured for a 2.4 GHz or 5 GHZ band.

13. The apparatus of claim 1, wherein said beacon frame comprises an S1G beacon frame.

14. The apparatus of claim 1, wherein the beacon frame is in compliance with an IEEE 802.11ah Specification.

15. The apparatus of claim 1 comprising a transmitter to transmit the beacon frame.

16. The apparatus of claim 1 comprising one or more antennas, a memory and a processor.

17. An apparatus comprising logic and circuitry configured to cause a wireless station to:
process reception of a beacon frame over a Sub 1 Gigahertz (GHz) (S1G) band according to a discovery scheme including a plurality of Neighbor Awareness Networking (NAN) Discovery Windows (DW), the beacon frame having one or more fields including NAN information, the beacon frame comprising a first timestamp field, a partial cluster Identifier (ID) field, and an information element comprising a second timestamp field, the partial cluster ID field comprising a partial Media Access Control (MAC) address of a NAN cluster, the first timestamp field comprising a first portion of a Time Synchronization Function (TSF) timer of the NAN cluster, the second timestamp field comprising a second portion, which is different from the first portion, of the TSF timer of the NAN cluster; and process communication during one or more of the NAN DWs according to the NAN information.

18. The apparatus of claim 17, wherein the first timestamp field includes four least significant octets of the TSF timer, and the second timestamp field includes four most significant octets of the TSF time.

19. The apparatus of claim 17 comprising one or more antennas, a memory and a processor.

20. A product including one or more tangible computer-readable non-transitory storage media comprising computer-executable instructions operable to, when executed by at least one computer processor, enable the at least one computer processor to cause a wireless device to:

generate a beacon frame having one or more fields including Neighbor Awareness Networking (NAN) information, the beacon frame comprising a first timestamp field, a partial cluster Identifier (ID) field, and an information element comprising a second timestamp field, the partial cluster ID field comprising a partial Media Access Control (MAC) address of a NAN cluster, the first timestamp field comprising a first portion of a Time Synchronization Function (TSF) timer of the NAN cluster, the second timestamp field comprising a second portion, which is different from the first portion, of the TSF timer of the NAN cluster; and transmit the beacon frame over a Sub 1 Gigahertz (GHz) (S1G) band according to a discovery scheme including a plurality of NAN Discovery Windows (DW).

21. The product of claim 20, wherein the first timestamp field includes four least significant octets of the TSF timer, and the second timestamp field includes four most significant octets of the TSF timer.

22. The product of claim 20, wherein the information element comprises an S1G beacon compatibility Information Element (IE).

23. A product including one or more tangible computer-readable non-transitory storage media comprising computer-executable instructions operable to, when executed by at least one computer processor, enable the at least one computer processor to cause a wireless device to:

receive a beacon frame over a Sub 1 Gigahertz (GHz) (S1G) band according to a discovery scheme including a plurality of Neighbor Awareness Networking (NAN) Discovery Windows (DW), the beacon frame having one or more fields including NAN information, the beacon frame comprising a first timestamp field, a partial cluster Identifier (ID) field, and an information element comprising a second timestamp field, the partial cluster ID field comprising a partial Media Access Control (MAC) address of a NAN cluster, the first timestamp field comprising a first portion of a Time Synchronization Function (TSF) timer of the NAN cluster, the second timestamp field comprising a second portion, which is different from the first portion, of the TSF timer of the NAN cluster; and communicate during one or more of the NAN DWs according to the NAN information.

24. The product of claim 23, wherein the first timestamp field includes four least significant octets of the TSF timer, and the second timestamp field includes four most significant octets of the TSF timer.

25. The product of claim 23, wherein the information element comprises an S1G beacon compatibility Information Element (IE).

* * * * *